United States Statutory Invention Registration [19]

[11] Reg. Number: H668

Rand [43] Published: Sep. 5, 1989

[54] NONLINEAR OPTICAL APPARATUS USING OPTICAL FIBERS

[75] Inventor: Stephen C. Rand, Agoura, Calif.

[73] Assignee: The United States of America as represented by the Secretary of the Air Force, Washington, D.C.

[21] Appl. No.: 870,048

[22] Filed: Jun. 3, 1986

[51] Int. Cl.[4] ..... G02B 6/26; G02B 6/10; G02B 5/23

[52] U.S. Cl. ..... 350/96.15; 350/96.1; 350/96.11; 350/96.34; 350/354

[58] Field of Search ..... 350/96.1, 96.11, 96.12, 350/96.13, 96.14, 96.15, 96.29, 96.30, 96.31, 96.33, 96.34, 353, 354; 307/425–430

[56] References Cited

U.S. PATENT DOCUMENTS

| | | | |
|---|---|---|---|
| 3,455,625 | 7/1969 | Brumley et al. | 350/96.22 |
| 3,868,589 | 2/1975 | Wang | 350/96.11 X |
| 3,909,749 | 9/1975 | Weber | 350/96.12 X |
| 3,935,472 | 1/1976 | Bethea et al. | 307/430 |
| 4,011,007 | 3/1977 | Phaneuf et al. | 350/96.25 |
| 4,354,735 | 10/1982 | Stowe et al. | 350/96.29 |
| 4,431,263 | 2/1984 | Garito | 350/96.34 |
| 4,461,536 | 7/1984 | Shaw et al. | 350/96.15 |
| 4,515,429 | 5/1985 | Smith et al. | 350/96.13 |
| 4,583,817 | 4/1986 | Papuchon | 350/96.14 |
| 4,632,518 | 12/1986 | Jensen | 350/354 X |
| 4,647,330 | 3/1987 | Rand | 350/96.1 X |

OTHER PUBLICATIONS

Stolen, "Nonlinear Propagation Effects in Glass Fibers," *Coherence and Energy Transfer in Glasses,* Plenum Press, New York, 1984, Ed. By Fleury & Golding, pp. 201–219.

*Primary Examiner*—Stephen C. Buczinski
*Assistant Examiner*—Linda J. Wallace
*Attorney, Agent, or Firm*—William Stephanishen; Donald J. Singer

[57] ABSTRACT

A nonlinear second order signal processing apparatus having a number of high quality optical fibers that are embedded in a nonlinear optical material in such a way that their cores are in evanescent contact with one another and the nonlinear medium.

8 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

NONLINEAR OPTICAL APPARATUS USING OPTICAL FIBERS

STATEMENT OF GOVERNMENT INTEREST

The invention described herein may be manufactured and used by or for the Government for governmental purposes without the paymen of any royalty thereon.

BACKGROUND OF THE INVENTION

The present invention relates broadly to a nonlinear optical apparatus, and in particular to an optical fiber apparatus which is embedded in a nonlinear optical material.

In the field of fiber optics and fiber optic devices, there are a variety of techniques and materials that are utilized to accomplish the transmission of light signals in a controlled and reproducible xanner. Exemplary in the art of fiber optics and fiber optic devices are the following U.S. Patents, which are incorporated herein by reference:

U.S. Pat. No. 3,455,625 issued to Brumley et al on July 15, 1969;

U.S. Pat. No. 4,011,007 issued to Phaneuf et al on Mar. 8, 1977;

U.S. Pat. No. 4,354,735 issued to Stowe et al on Oct. 19, 1982;

U.S. Pat. No. 4,431,263 issued to Garito on Feb. 14, 1984; and,

U.S. Pat. No. 4,461,536 issued to Shaw et al on July 24, 1984.

The Brumley et al reference, U.S. Pat. No. 3,455,625, discloses an optical coupling system for coupling a plurality of bundles of optical fibers to achieve a single light transmitting bundle without significant attenuation of the light. The apparatus is further characterized by the coupling material which conforms to the shape of the end of each fiber bundle so that the individual fibers in the bundles are contacted to provide a continuous optical path from input fibers to output fibers. The Stowe et al reference, U.S. Pat. No. 4,354,735 relates to an acousto-optic transducer which utilizes an optical fiber core having a first refractive index profile and an optical cladding encircling the core and having a second refractive index profile different from that of the optical fiter core. The transducer is arranged so that spatial average of the core refractive index profile is only slightly greater than that of the cladding refractive index profile. Thus, light is caused to propagate in the core with effectively minimum loss thereof to the cladding.

The Phaneuf et al reference, U.S. Pat. No. 4,011,007 describes an optical fiber bundle image conduit which utilizes a plurality of optical glass cores of selected refractive index and dimension that are clad with a first glass of lower refractive index providing substantially total internal reflection within the cores. The clad cores are then clad with a glass displaying a lower viscosity than either the core or the first cladding and fused into a final assembly. The cross-sectional area of the second core cladding is selected to provide a minimum free space within the fused assembly.

The Garito reference, U.S. Pat. No. 4,431,263, discloses materials that are useful in the elaboration of thin film, single crystal and other devices. The invention describes nonlinear optical and other materials that are suitable for use in electro-optical, second harmonic generating, electro-acoustic, piezoelectric, pyroelectric, waveguide, semiconductcr and other devices especially those wherein arrays or aggregates of films or layers may be employed as constituents.

The Shaw et al reference, U.S. Pat. No. 4,461,536, describes a fiber coupled displacement transducer apparatus that utilizes the sensitivity of a fiber optical coupler to mechanical displacement of its coupler elements as the basis for an extremely high resolution, non-electromagnetic displacement transducer.

Additional prior art references that are pertinent to the present invention are:

(a) Charles J. Koester et al, Amplification in a Fiber Laser, Applied Optics, Vol. 3, No. 10, October 1964.

(b) Charles J. Koester, Laser Action by Enhanced Total Internal Reflection, IEEE, Journal of Quantum Electronics, Vol. QE-2, No. 9, Septembr 1966.

(c) Roger H. Stolen et al, Paraxetric Amplification and Frequency-Conversion in Optical Fibers, IEEE, Journal of Quantum Electronics, Vol. QE-18, No. 7, July 1982.

(d) G. H. Hewig et al, Frequency doubling in a $LiNbO_3$ thin film deposited on sapphire, J. Appl. Phys. 54(1), January 1983.

(e) Bridges et al, Liquid Core Fibers, Opt. Letters 6, 632 (1981).

Previous nonlinear optical fibers have relied on 4-wave xixing in glass fibers (R. Stolen and J. Bjorkholm, IEEE J. Q. E., QE-18, 1062 (1982)), doping of glass fiber claddings (C. Koester, IEEE J. Q. E., QE-2, 580 (1966)) or cores (C. Koester and E. Snitzer, Appl. Opt. 3, 1182 (1964)), or liquid core fibers (Chraplywy, T. Bridges, A. Opt. Lett. 6, 632 (1981)). However, no second order processes like phase-matched frequency doubling have been reported for single crystal hybrid single crystal fibers because these devices have not been available until now. Although planar waveguides have been used for frequency doubling (G. Hewig and K. Jain, J. Appl. Phys. 54, 57 (1983)), their efficiency is limited by short interaction length, a problem which is solved by the embedded fiber devices. It may also be noted that the use of planar guides in fiber optic systems is hampered by low damage thresholds and high coupling losses.

The purpose of the present invention is to perform second order nonlinear optical signal processing in amorphous glass fibers. Therefore, any apparatus that is utilized in a low power lasers such as frequency generators and "in-line", all-optical signal amplifiers operating in a parametric fashion can be realized using this invention.

This invention also addresses a major problem in fiber optical communication schemes. Currently, most integrated optical data processors and nonlinear optical processors are fabricated on planar structures. However, there exist major practical (i.e. mechanical) and fundamental (mode matching) problems in achieving low loss coupling of radiation in fibers with these planar devices. With this invention, the embedded fibers act as the guiding stuctures, and thereby minimize coupiing losses. The present invention is intended to satisfy that need.

SUMMARY OF THE INVENTION

The present invention utilizes embedded optical fiber conductors in a non-linear optical medium to form a second order optical signal processing device. A numter of high quality optical fibers are embedded in a nonlinear optical medium in such a way that their cores are in evanescent contact with one another and the nonlinear medium to accomplish signal coupling between the fibers. The evanescent coupling between the glass fibers which are embedded in the nonlinear medium enables the performance of second order nonlinear optical signal processing in the amorphous glass fibers. The second order signal processing device may be utilized as frequency doublers, sum and difference frequency generators and optical signal amplifiers. Since the embedded fibers are utilized as guiding structures, the coupling losses between the glass fiters is minimized.

It is one object of the present invention, therefore, to provide an improved nonlinear optical apparatus.

It is another object of the invention to provide an improved nonlinear apparatus which utilizes embedded optical fibers.

It is another object of the invention to provide an improved nonlinear apparatus which utilizes glass fibers that are embedded in a nonlinear optical material.

It is another object of the invention to provide an improved nonlinear apparatus wherein the fibers in the nonlinear material are coupled to each other to perform second order optical signal processing.

It is another object of the invention to provide an improved nonlinear apparatus wherein a pair of glass fibers embedded in a nonlinear medium are evanescently coupled to each other and to the nonlinear material.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
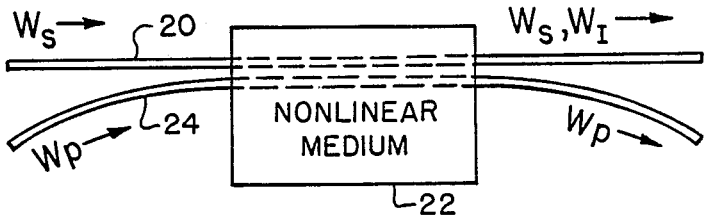
FIG. 1 is a schematic diagram of the nonlinear optical apparatus according to the present invention.

Referring now to FIG. 1, there is shown a nonlinear optical apparatus which utilizes glass fibers that are embedded in a nonlinear material to perform second order signal processing. A first glass fiber conductor 20 is shown embedded in a nonlinear optical medium 22. The first glass fiber conductor 20 ispositioned near the top surface of the substantially rectangular solid which comprises the nonlinear optical medium 22. A first optical signal $W_s$ is applied as an input signal to the first glass fiber conductor 20.

A second glass fiber conductor 24 is shown embedded in the nonlinear optical medium 22. The second glass fiber conductor 24 comprises the saxe or substantially the same glass fiber material as the first glass fiber conductor 20. The second glass fiber conductor 24 is positioned in close proximity to and substantially parallel with the first glass fiber conductor 20 in the nonlinear optical medium 22. While it may be noted that the geometric relation between the first glass fiber conductor 20 and the second glass fiber conductor 24 is substantially a vertical alignment in the nonlinear optical medium 22, the physical positioning of the glass fiber conductors 20, 24 may occur in the horizontal plane within the nonlinear optical medium 22 or in substantially any other plane configuration therein. It may also be noted that the nonlinear optical medium 22 may comprise any suitable commercially-available nonlinear optical material.

As shown in FIG. 1, the glass fiber conductors 20, 24 comprise two fibers whose cores are arranged to be evanescently coupled to a nonlinear optical medium 22 and to each other. The process for embedding the two glass fiber conductors 20, 24 may be accomplished by the growth of the crystal around fibers in solution. Alternatively, the glass fiber embedding process may be accomplished by a saturated solution pressing technique. In any case, the process for embedding the glass fiber conductors 20, 24 in the nonlinear optical material 22 may be such as that shown by J. F. Nye in Phil. Mag. (G.B.) 17, 1249–66 (1967) or by a method in which a fiber may be pressed into a crystal in a saturated solution of the same composition as the crystal. The latter method can be used for materials which exhibit a negative volume change solution which makes pressure-induced melting or embedding possible.

A second optical signal $W_p$ is applied as an input signal to the second glass first conductor 24. The second order nonlinearity characteristics of the nonlinear optical medium 22 evanescently couples and amplifies the first optical signal wave $W_s$ at the expense of the second optical signal (pump) wave $W_p$ when the phase matching condition is satisfied for the particular optical frequencies that are involved. The phase matching is accomplished by the variations in the guide dimensions for a given nonlinear optical embedding material.

Figure 2:
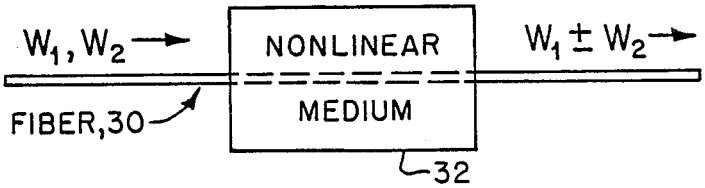
FIG. 2 is a schematic diagram of the nonlinear optical apparatus in a circuit configuration to perform the process of frequency summation or difference.

Turning now to FIG. 2, there is shown a schematic diagram of a nonlinear optical signal processing apparatus which is arranged in a circuit configuration to perform the process of frequency summation or difference. A single glass fiber conductor 30 is shown embedded in a nonlinear optical medium 32. The single glass fiter conductor 30 is positioned substantially near the center of the rectangular solid which comprises the nonlinear optical medium 32. A pair of input optical signals $W_1$, $W_2$ are applied to the single glass fiber conductor 30. The two optical signals are evanescently coupled to the nonlinear optical medium 32 wherein they interact with one another to form the output optical signals, $W_1 \pm W_2$.

The nonlinear optical apparatus as shown in FIG. 2 comprises a single glass fiber conductor 30 which has a pair of signals applied thereto to form the embedded fiter configuration for generation of the frequency summation or difference for the applied input optical signals, $W_1$, $W_2$. The dimensions of the nonlinear optical guide may be tailored to achieve phase-matching for summing or differencing of the two particular input frequencies $W_1$ and $W_2$. The nonlinear optical material 32 which encompasses the glass fiber conductor 30 may be oriented in any of many different directions with respect to the fiber axis to exploit any given nonlinear susceptibility tensor component $d_{ijk}$. While the nonlinear second order optical apparatus configuration of FIG. 1 will provide a tuned amplifier or repeater unit for use in a fiber communications system, the configuration of the apparatus in FIG. 2 will provide the basis for a frequency converter with arbitrarily long interaction lengths.

The second order nonlinear optical signal processor apparatus has the capability to perform a variety of optical signal processing functions. It will provide optical repeaters and other devices which may be readily incorporated into existing systems and simplify coupling to future fiber communication links. It will also provide upconversion of weak infrared signals to the visible region for which high efficiency, room temperature detectors are available.

Although the invention has been described with reference to a particular embodiment, it will be understood to those skilled in the art that the invention is capable of a variety of alternative embodiments within the spirit and scope of the appended claims.

What is claimed is:

1. A second order optical signal processing apparatus comprising in combination:

a nonlinear optical medium providing nonlinear second order signal coupling, and a predetermined number of optical fibers embedded in said nonlinear optical medium, said optical fibers being positioned in close proximity to and substantially parallel with each other, said optical fibers being evanescently coupled to each other and to said nonlinear optical medium to perform second order signal processing of optical signals which are applied to said optical fibers.

2. A second order optical signal processing apparatus as described in claim 1 wherein said nonlinear optical medium comprises a substantially rectangular solid whose dimension may be varied to accomplish phase matching between said optical signals.

3. A second order optical signal processing apparatus comprising in combination:

a nonlinear optical medium providing nonlinear second order signal coupling; and, a single optical fiber, a first and second optical signal being applied to said single optical fiber, said first and second optical signal being evanescently coupled to each other in said nonlinear medium to produce an output signal.

4. A second order optical signal processing apparatus as described in claim 2 wherein said predetermined number of optical fibers comprise a first and second fiber, said second fiber being positioned within said nonlinear optical medium in close proximity to and substantially parallel with said first fiber, said first fiber having a first optical signal applied thereto, said second fiber having a second optical signal applied thereto, said first optical signal being amplified by the second order nonlinearity of said optical medium at the expense of said second optical signal.

5. A second order optical signal processing apparatus as described in claim 2 wherein said nonlinear optical medium comprises a crystalline structure which may be oriented in different directions with respect to the axis of said optical fiber to utilize any given nonlinear tensor component of said nonlinear optical medium.

6. A second order optical signal processing apparatus as described in claim 3 wherein said output signal may comprise the sum or difference of said first and second optical signal.

7. A second order optical signal processing apparatus as described in claim 3 wherein said single fiber is substantially centered within said nonlinear optical medium.

8. A second order optical signal processing apparatus as described in claim 4 wherein said nonlinear optical medium has an upper surface, said first and second fiber is positioned substantially near said upper surface of said nonlinear optical medium.

* * * * *